(12) United States Patent
Guering

(10) Patent No.: US 7,823,831 B2
(45) Date of Patent: Nov. 2, 2010

(54) AIRCRAFT CABIN LAYOUT HAVING BERTHS IN THE UPPER PORTION OF THE CABIN

(75) Inventor: Bernard Guering, Montrabe (FR)

(73) Assignee: Airbus France, Toulouse (FR)

( * ) Notice: Subject to any disclaimer, the term of this patent is extended or adjusted under 35 U.S.C. 154(b) by 542 days.

(21) Appl. No.: 11/775,893

(22) Filed: Jul. 11, 2007

(65) Prior Publication Data

US 2008/0073463 A1 Mar. 27, 2008

(30) Foreign Application Priority Data

Jul. 12, 2006 (FR) .................................... 06 06349

(51) Int. Cl.
 *B64D 13/00* (2006.01)
(52) U.S. Cl. .................................... 244/118.6; 105/316
(58) Field of Classification Search .............. 244/118.6, 244/118.5; 105/316
See application file for complete search history.

(56) References Cited

U.S. PATENT DOCUMENTS

| 6,059,364 | A | 5/2000 | Dryburgh et al. | |
|---|---|---|---|---|
| 7,025,306 | B2 * | 4/2006 | Saint Jalmes | 244/118.6 |
| 7,156,344 | B1 * | 1/2007 | Guering | 244/118.5 |
| D580,846 | S * | 11/2008 | Bladt et al. | D12/345 |
| 2002/0070314 | A1 | 6/2002 | Schmidt-Schaeffer | |
| 2004/0195451 | A1 * | 10/2004 | Bentley et al. | 244/118.6 |
| 2004/0232283 | A1 * | 11/2004 | Ferry et al. | 244/118.6 |
| 2005/0178909 | A1 * | 8/2005 | Mills | 244/118.6 |
| 2006/0000947 | A1 * | 1/2006 | Jacob | 244/118.6 |
| 2006/0065783 | A1 * | 3/2006 | Mills | 244/118.6 |
| 2007/0080566 | A1 * | 4/2007 | Ferry et al. | 297/248 |
| 2008/0149765 | A1 * | 6/2008 | Retz et al. | 244/118.6 |
| 2008/0302911 | A1 * | 12/2008 | Warner et al. | 244/118.6 |

FOREIGN PATENT DOCUMENTS

| DE | 0578954 | * | 1/1994 |
|---|---|---|---|
| EP | 0 901 964 | | 3/1999 |
| FR | 2 403 253 | | 4/1979 |
| FR | 2 769 286 | | 4/1999 |
| FR | 2 873 349 | | 1/2006 |

OTHER PUBLICATIONS

U.S. Appl. No. 12/336,988, filed Dec. 17, 2008, Guering, et al.
U.S. Appl. No. 12/373,055, filed Jan. 9, 2009, Guering.

* cited by examiner

*Primary Examiner*—Christopher P Ellis
(74) *Attorney, Agent, or Firm*—Oblon, Spivak, McClelland, Maier & Neustadt, L.L.P.

(57) ABSTRACT

An aircraft cabin includes: a deck forming a plane surface on which seats are fastened; an aisle extending longitudinally in the cabin and elevated in relation to the deck; and berths served by the aisle, arranged at an angle above the seats of the deck on both sides of the aisle.

13 Claims, 3 Drawing Sheets

AIRCRAFT CABIN LAYOUT HAVING BERTHS IN THE UPPER PORTION OF THE CABIN

BACKGROUND OF THE INVENTION

I. Field of the Invention

This invention relates to an aircraft cabin layout having berths in the upper portion of the cabin.

II. Description of Related Art

The technical area of the invention is the transport of passengers in an aircraft, in particular a long-haul aircraft. The long trips proposed by the airline companies often are made at least partially at night. In order to enhance the comfort of the passengers, the airline companies therefore wish to be able to offer them bedding places.

Numerous suggestions already have been made for proposing to convert seats into berths or for laying out an aircraft cabin in such a way that it can accommodate passengers in a lying-down position.

Thus it is already known to lay out the upper portion of an aircraft cabin so that it can accommodate lying-down passengers. Document EP-0 901 964 proposes, for example, arranging berths served by an aisle in the upper portion of an aircraft cabin. As is seen on the Figures of this document, the number of berths is very limited. For this reason, the use of these berths is reserved instead for the flight personnel.

As for the document FR-2 873 349, it proposes increasing the number of berths available by arranging the latter crosswise in relation to an elevated aisle of an aircraft cabin deck. This solution, however, is applicable only to aircraft in which the fuselage has a considerable diameter in section.

BRIEF SUMMARY OF THE INVENTION

This invention then has as its purpose providing a possibility for a sleeping arrangement in the upper portion of an aircraft cabin, even for aircraft having a fuselage of relatively small size.

To this end, it proposes an aircraft cabin intended for the transport of passengers comprising:
  a deck forming a plane surface on which seats are fastened,
  an aisle extending longitudinally in the cabin and elevated in relation to the deck, and
  berths served by the said aisle and arranged above the seats of the deck.

According to this invention, the berths served by the elevated aisle are arranged at an angle on both sides of the latter.

In this way, it is possible to accommodate a relatively large number of passengers in lying-down position in the upper portion of the aircraft cabin. The available space in the upper portion of the cabin thus is used to good advantage to make it possible for passengers to travel lying down.

According to the width available at the level of the berths, the latter are positioned in relation to the longitudinal aisle at an angle between 30 and 60°. An angle of about 45° is preferred.

In a preferred embodiment, the walls delimiting the berths comprise, on the side of the longitudinal aisle, a first portion more or less perpendicular to the longitudinal aisle and a second portion forming an angle between 30 and 60° with the longitudinal axis of the aircraft. This latter measurement corresponds to the positioning measurement of the berths in relation to the longitudinal aisle. On the side opposite the longitudinal aisle, the walls delimiting the berths comprise, for example, a third portion more or less parallel to the longitudinal aisle and a fourth portion forming an angle between 30 and 60° with the longitudinal axis of the aircraft. This fourth portion extends, for example, perpendicular to the second portions referred to above when the wall has the first, second, third and fourth portions together.

In one embodiment, the invention provides that a ladder or similar arrangement makes it possible to access each of the ends of the elevated aisle.

To best organize the space in the cabin, the elevated aisle advantageously is suspended from the ceiling of the cabin and is arranged, for example, above the seats. In this embodiment, the cabin preferably comprises each time a longitudinal aisle arranged below a row of berths.

This invention relates finally to an aircraft, characterized in that it comprises a cabin such as described above.

The details and advantages of this invention will emerge more clearly from the description that follows, presented with reference to the attached schematic drawings, in which:

DETAILED DESCRIPTION OF THE INVENTION

Figure 1:
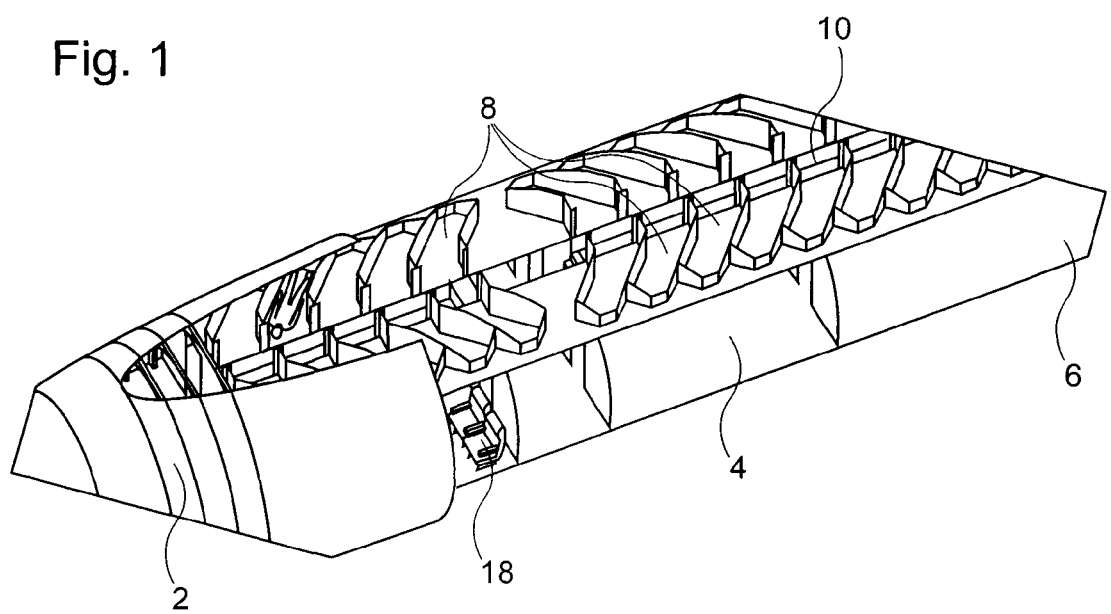
FIG. 1 is a partially cut-away perspective view of an airplane cabin equipped with a layout according to the invention.

On FIG. 1 there is seen an airplane fuselage 2 in the interior of which is located a cabin 4 intended to accommodate passengers.

A deck 6, in the remainder of the description assumed to be horizontal, divides the fuselage over more or less its entire length into two zones: an upper zone comprising the cabin 4 and a lower zone comprising a hold not illustrated.

In the remainder of the description it is assumed that the deck 6 is horizontal and extends in the same plane over the entire length and width of the airplane. It also is assumed that the cabin 4 is located above the deck 6 whereas the hold is located below the latter.

According to one characteristic of the invention, berths 8 are located in the upper portion of the cabin 4. These berths 8 are arranged horizontally, that is, parallel to the deck 6. They are arranged at an angle on both sides of a longitudinal aisle 10 that extends longitudinally in relation to the fuselage 2. As is seen on the drawings, there thus are two rows of berths 8 arranged on both sides of the longitudinal aisle 10.

The longitudinal aisle 10 makes it possible to access the berths 8. It has a floor 12 that, like the berths 8, is suspended from the ceiling structure of the cabin 4. In this way a foot-bridge elevated in relation to the deck 6 is produced. This foot-bridge is centered on the longitudinal axis of the cabin 4. Access to this foot-bridge is provided, for example, by means of two ladders 14 or similar arrangements, one ladder at each end of the longitudinal aisle 10. A lateral wall 16 on both sides of the longitudinal aisle 10 connects the floor 12 of the latter with the berths 8. The longitudinal aisle 10 thus is isolated from the rest of the cabin 4.

Figure 2:
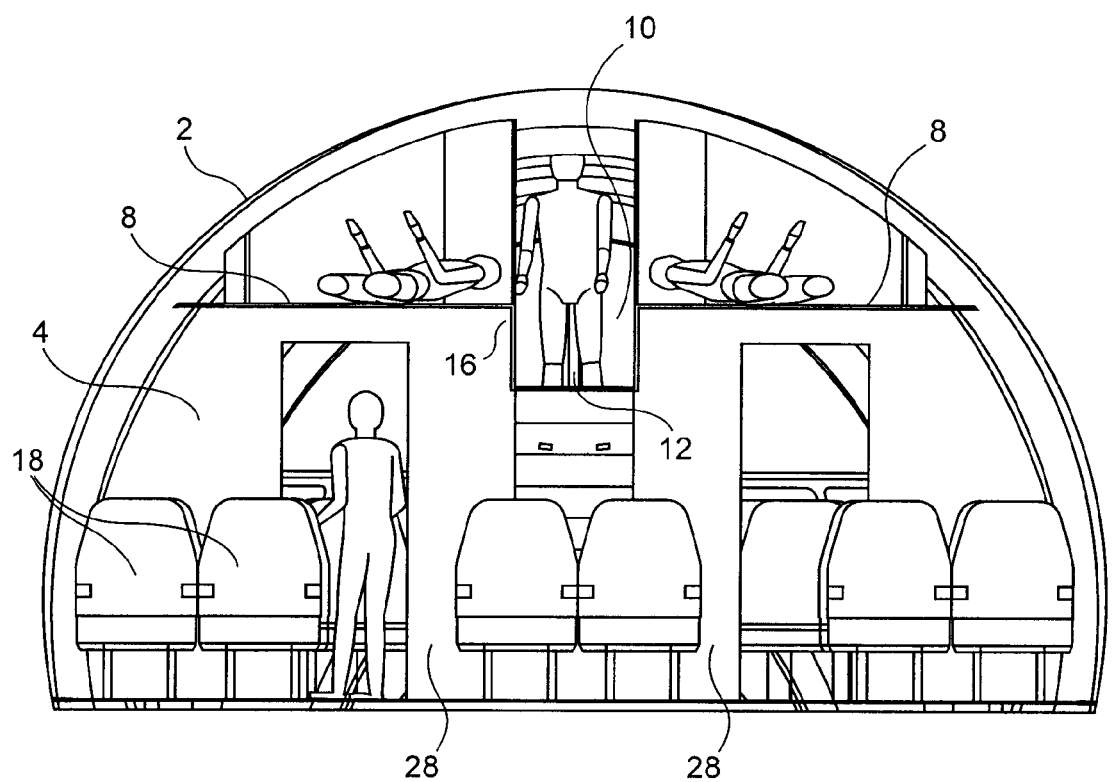
FIG. 2 is a view in cross section of a cabin according to the invention.
Figure 3:
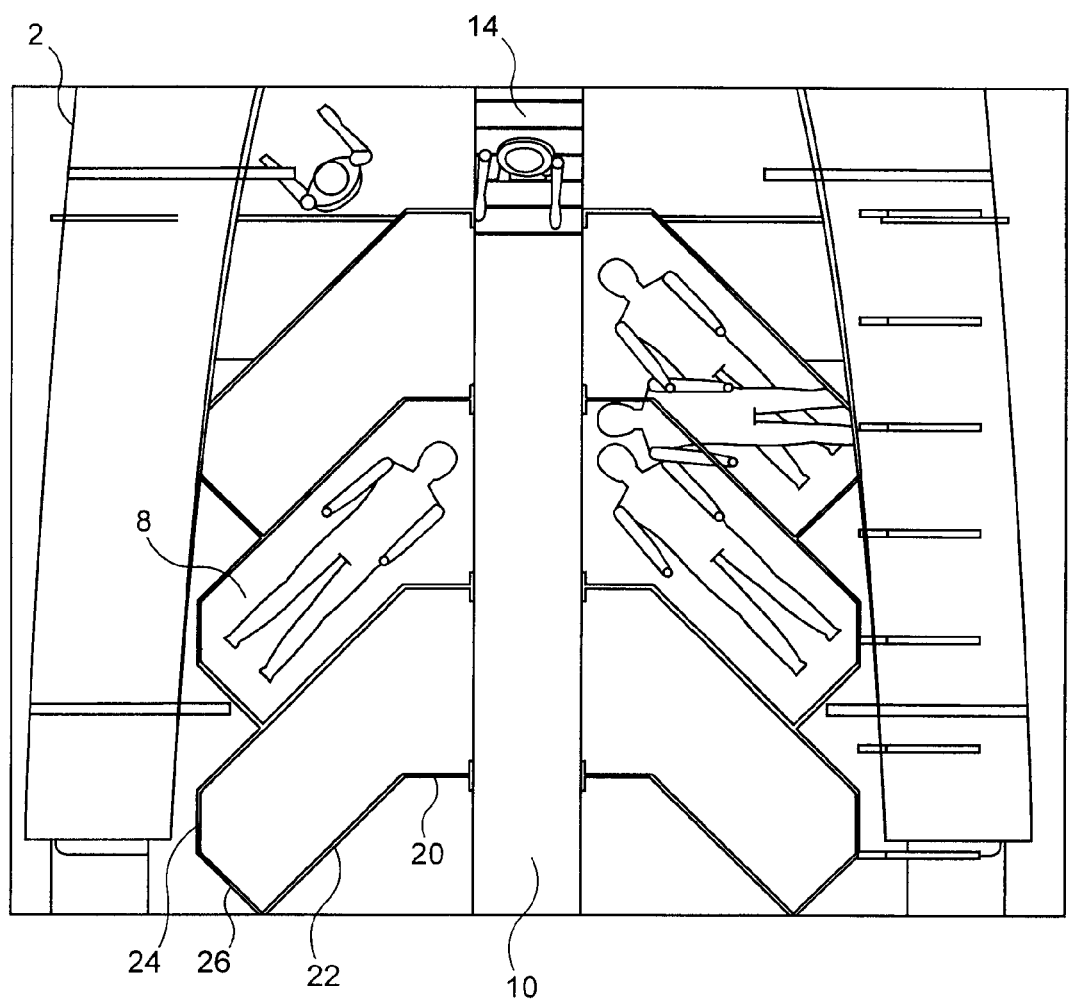
FIG. 3 shows berths of a cabin layout according to the invention in a view from above.

The longitudinal aisle 10, as illustrated on FIG. 2, is, for example, arranged above two rows of seats 18. In fact, at the level of the seats, the ceiling height can be reduced. This is then used to good advantage to lower the level of the floor 12 of the longitudinal aisle 10 so that it is possible to move about in the latter.

The berths 8 are positioned in relation to the longitudinal aisle 10 so as to form with the latter an angle between 30 and 60°. On the drawings, the angle chosen is approximately 45°.

The berths 8 are isolated from one another with the aid of walls and are open on the longitudinal aisle 10. It is understood, of course, that a curtain, not illustrated, can be provided at each berth 8 to separate them from the longitudinal aisle 10.

A wall delimiting a berth 8 has a complex form. On the side of the longitudinal aisle 10, there is located on both sides of the berth 8 a first portion 20 arranged perpendicular to the longitudinal aisle 10. By way of non-limitative example, this first portion measures between 30 and 50 cm, for example 40 cm. These first portions 20 each are prolonged by a second portion 22 that extends parallel to the berth 8 and that imparts its positioning thereto. In the preferred embodiment illustrated in the drawings, these second wall portions then extend with an angle of 45° in relation to the longitudinal aisle 10. On the side opposite the longitudinal aisle 10, the berth 8 is closed by a back. The latter itself is made in two portions: a third portion 24 parallel to the longitudinal aisle 10 and a fourth portion 26 extending perpendicular to the second portions 22 of the wall.

The form of this wall makes it possible to implement a large opening for accessing the berth 8 and access to the latter thus is facilitated. The form of the back of the wall makes it possible to provide, on the outside of the wall, a space that can be used for technical purposes.

The solution proposed above for arranging berths in an aircraft makes it possible for the first time to suggest that a large number of passengers can travel lying down in a medium-sized airplane. For an airplane designed to accommodate approximately 200 to 250 passengers, the proposed solution makes it possible to provide a berth to about fifty passengers.

The solution proposed for implementing berths does not cause a significant excess weight for the airplane. In fact, the structure for implementing the berths can be relatively light. Furthermore, a saving of mass is achieved on at least certain seats 18 which, instead of being very heavy convertible seats, are much lighter seats 18.

The configuration proposed on FIG. 2 makes it possible to manage the limited height of the cabin 4. In the center, the highest portion of the cabin 4, are the seats fastened at the level of the deck 6, while in the upper portion of the cabin is the longitudinal aisle 10. The seats 18 are arranged in a 2-2-2 configuration that makes it possible to have two aisles 28 for access to the seats, these aisles 28 being parallel to the longitudinal aisle 10 and arranged on both sides of the latter. This configuration with six seats abreast corresponds, for example, to a configuration of a business-class compartment. One could have another configuration with more seats abreast for an economy-class compartment or fewer seats for a first-class one.

This invention is not limited to the embodiments described above by way of non-limitative examples. It also relates to all the variant embodiments within the capacity of the individual skilled in the trade, in the context of the claims below.

The invention claimed is:

1. An aircraft cabin configured for a transport of passengers, comprising:
    a deck forming a planar surface on which seats are fastened;
    an aisle extending longitudinally in the cabin and elevated in relation to the deck; and
    berths arranged on both lateral sides of the aisle and above the seats of the deck,
    wherein the aisle extends between, and substantially below, a plurality of the berths; and
    wherein the berths are arranged at a non-parallel and non-perpendicular angle with respect to an axis of the aisle.

2. The aircraft cabin according to claim 1, wherein the berths are positioned in relation to the aisle at an angle between 30 and 60°.

3. The aircraft cabin according to claim 1, wherein walls delimiting the berths comprise:
    adjacent to the aisle, a first portion substantially perpendicular to the aisle, and
    a second portion forming an angle between 30 and 60° with the aisle.

4. The aircraft cabin according to claim 3, wherein the walls delimiting the berths comprise:
    on a lateral side opposite the aisle, a third portion substantially parallel to the aisle, and
    a fourth portion forming an angle between 30 and 60° with the longitudinal axis of the aircraft and substantially perpendicular to the second portion.

5. The aircraft cabin according to claim 1, wherein a ladder allows access to each end of the aisle.

6. The aircraft cabin according to claim 1, wherein the aisle is suspended from a ceiling of the cabin and is arranged above the seats.

7. The aircraft cabin according to claim 6, wherein the cabin further comprises a longitudinal aisle arranged below a row of berths.

8. An aircraft, comprising the cabin according to claim 1.

9. The aircraft cabin according to claim 1, further comprising:
    a ladder providing access to each longitudinal end of the aisle.

10. The aircraft cabin according to claim 1, wherein the berths are arranged at a substantially non-perpendicular angle with respect to the aisle.

11. The aircraft cabin according to claim 1, wherein the aisle is suspended from a ceiling of the aircraft cabin.

12. The aircraft cabin according to claim 1, wherein the plurality of berths are suspended from a ceiling of the aircraft cabin.

13. The aircraft cabin according to claim 1, further comprising:
    a lateral wall arranged on both lateral sides of the aisle, the wall connecting a floor of the aisle with the plurality of berths.

\* \* \* \* \*